United States Patent Office 3,444,128
Patented May 13, 1969

3,444,128
SUCCINIMIDOALKYLSILOXANES
Tse C. Wu, Waterford, N.Y., assignor to General Electric
Company, a corporation of New York
No Drawing. Filed Dec. 5, 1967, Ser. No. 688,017
Int. Cl. C08g 31/24; C07f 7/10
U.S. Cl. 260—46.5  12 Claims

ABSTRACT OF THE DISCLOSURE

Silanes and siloxanes containing silicon-bonded

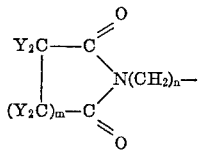

radicals, where Y is a member selected from the class consisting of hydrogen, halogen and methyl, $m$ is an integer equal to from 1 to 2, inclusive, and $n$ is an integer equal to from 2 to 3, inclusive, are prepared by first reacting an N-vinyl-N-allyl succinimide or glutarimide with a silane containing silicon-bonded hydrogens and then converting the silanes to siloxane homopolymers and copolymers. These siloxanes are useful in the preparation of silicone fluids and elastomers having improved resistance to hydrocarbon solvents.

---

This application is directed to silanes and siloxanes containing imidoalkyl groups attached to silicon through silicon-carbon linkages.

In the development of organopolysiloxanes, advantage has been taken in many applications of the unusual thermal stability of silicone materials. Thus, one very useful form of silicones is in elastomeric materials which can be used at very high temperatures where ordinary hydrocarbon rubber materials fail. However, one of the recognized disadvantages of silicone elastomers has been lack of resistance to solvents at moderate or elevated temperatures. Attempts to solve this problem by the addition of various polar groups into the silicone molecule have met with limited success and while solvent resistance has been increased, it has often been at the expense of thermal and hydrolytic stability.

The present invention is based on my discovery of a new class of organosilicon compounds which permits the preparation of various types of organosilanes, including organosiloxane elastomers with an improved combination of solvent resistance, thermal stability and hydrolytic stability. The present invention is based on my discovery of a new class of organosilicon compounds characterized by the presence of silicon-bonded imidoalkyl radicals having the formula:

(1)
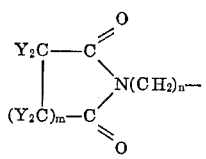

where Y is hydrogen, halogen or methyl, $m$ is an integer equal to from 1 to 2, inclusive, and $n$ is a whole number equal to from 2 to 3, inclusive.

The imidoalkyl-substituted organosilicon compounds of the present invention consist of silanes having the formula:

(2)
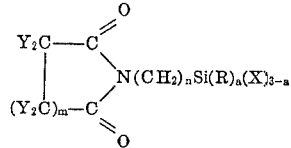

where Y, $m$ and $n$ are as previously defined, R is a member selected from the class consisting of lower alkyl radicals, halogenated lower alkyl radicals and halogenated mononuclear aryl radicals, X is a hydrolyzable group, $a$ is a whole number equal to from 0 to 2, inclusive.

The present invention also is directed to organosiloxanes having units of the formula:

(3)
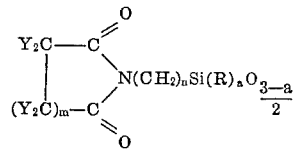

alone or copolymerized with other siloxane units having the formula:

(4) 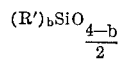

where R' is a member selected from the class consisting of monovalent hydrocarbon radicals, halogenated monovalent hydrocarbon radicals and cyanoalkyl radicals, at least 95 mole percent of the R' radicals being within the scope of the radicals represented by R, and $b$ is an integer equal to from 1 to 3, inclusive.

From the foregoing description of the invention, it is seen that the characteristic feature of the silanes and siloxanes of the present invention is the attachment to silicon through either a divalent ethylene or propylene radical of a substituted or unsubstituted succinimide radical or glutarimide radical. The radical is a succinimide radical when $m$ is equal to 1 and a glutarimide radical when $m$ is equal to 2.

In the above formulas, all of the Y groups can be the same or the Y groups can represent a number of different radicals within the scope of hydrogen, halogen and methyl radicals. As to the particular halogen atom, Y can be any of the halogens, but the preferred halogen group is the fluorine group. Again, in the preferred embodiment of my invention, all of the various Y radicals are the same, rather than being a mixture of different groups. Illustrative of the radicals represented by R are lower alkyl radicals, e.g., methyl, ethyl, propyl, butyl, heptyl, etc. radicals; halogenated alkyl radicals, e.g., chloromethyl, difluoromethyl, chlorobutyl, etc. radicals; halogenated phenyl radicals, e.g., chlorophenyl, dibromophenyl, pentachlorophenyl, etc. radicals.

The hydrolyzable groups represented by X include halogen, hydrocarbonoxy radicals, acyloxy radicals derived from monocarboxylic acids having from 1 to 4 carbon atoms, amine groups, lower monoalkylamine and dialkylamine radicals, as well as hydrocarbonoxy radicals, such as lower alkoxy radicals, mononuclear aryloxy radicals and mononuclear lower aralkoxy radicals, where the hydrocarbon portions of the various hydrocarbonoxy radicals are the same as those described for the hydrocarbon radicals attached to silicon within the scope of R.

Illustrative of the specific radicals within the scope of X are, for example, chlorine, bromine, iodine, etc. radicals; formyl, acetyl, propionyl, butyryl, etc. radicals; methoxy, ethoxy, butoxy, heptoxy, etc. radicals; phenoxy, benzoxy, phenylethoxy, etc. radicals; and monoalkyl and dialkyl amino radicals, where the alkyl radicals are lower alkyl groups containing from 1 to 7 carbon atoms, such as methylamino, methylethylamino, dibutylamino, etc. In the preferred embodiment of my invention, the radical represented by X is chlorine and the radical represented by R is methyl.

Illustrative of the monovalent hydrocarbon radicals, halogenated monovalent hydrocarbon radicals and cyano-alkyl radicals within the scope of R' of Formula 4 are alkyl radicals, e.g., methyl, ethyl, propyl, butyl, decyl, octadecyl, etc. radicals; alkenyl radicals, e.g., vinyl, allyl, etc. radicals; cycloalkyl radicals, e.g., cyclohexyl, cycloheptyl, etc. radicals; cycloalkenyl radicals, e.g., cyclohexenyl, cycloheptenyl, etc. radicals; aryl radicals, e.g., mononuclear aryl radicals, such as phenyl, xylyl, tolyl, etc. radicals; and polynuclear aryl radicals, such as naphthyl, etc. radicals; aralkyl radicals, and in particular mononuclear lower aralkyl radicals, such as, for example, benzyl, phenylethyl, etc. radicals; halogenated monovalent hydrocarbon radicals and in particular halogenated derivatives of the aforementioned radicals, including chlormethyl, chlorethyl, bromoethyl, dichloropropyl, chlorophenyl, bromophenyl, trifluoromethylphenyl, etc. radicals; and cyanoalkyl radicals, preferably cyanoalkyl radicals in which the alkyl radical contains from 2 to 4 carbon atoms with the cyano group attached to at least the second carbon atom removed from silicon, e.g., beta-cyanoethyl, beta - cyanopropyl, gamma - cyanopropyl, delta-cyanobutyl, etc. radicals. In the preferred embodiment of my invention, R is methyl.

The silanes within the scope of Formula 2 are prepared by reacting an N-vinyl or N-allyl succinimide or glutarimide having the formula:

(5) 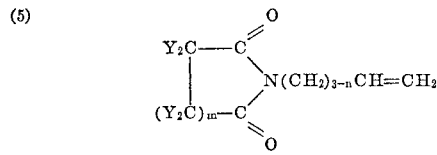

with a silane having the formula:

(6) $HSi(R)_a(X)_{3-a}$ in the presence of a catalyst which facilitates the addition of the SiH group of the silane of Formula 6 across the vinyl group of the imide of Formula 5. In the above formulas, Y, R, and X and m, n and a are as previously defined. Typical compounds within the scope of Formula 5 include the preferred specific compound, which is N-vinyl-succinimide, as well as other materials, such as N-vinyl-glutarimide, N-allylsuccinimide, N-allylglutarimide, N-vinyl-2-fluorosuccinimide, N-vinyl-2,3-difluorosuccinimide, N-allyl-2,3,4-trifluoroglutarimide, N-vinyl-2,2,4,4-tetra - fluorosuccinimide, N-vinyl-2-methylsuccinimide, etc.

Illustrative of the many silanes within the scope of Formula 6 are methyldichlorosilane, trichlorosilane, dimethylbromosilane, methyldiethoxysilane, chlorophenyl-dimethoxysilane, ethyldiacetoxysilane, N,N-diethylaminodimethylsilane, etc. The preferred specific silane within the scope of Formula 6 is methyldichlorosilane.

To prepare the silane of Formula 2 from the imide of Formula 5 and the silane of Formula 6, the imide and the silane are merely mixed together, with or without solvent, in the ratio of approximately one mole of the imide per mole of the silane, and a sufficient amount of an SiH-olefin platinum addition catalyst is added to the reaction mixture to provide the desired amount of platinum and the reaction mixture is raised to the desired temperature and the addition is effected. While the stoichiometry of the reaction calls for equimolar amounts of the two reactants, a 50 to 100 percent excess of either of the reactants can be employed, but the use of an excess greater than 100 percent results in a reduction in the efficiency of the reaction.

The particular catalysts which can be employed for the reaction are well known in the art and, in general, the catalyst is either elemental platinum or a platinum compound catalyst, with the platinum compound catalyst being most preferred. Illustrative of the type of platinum compound catalyst which can be used for the addition reaction are the elemental platinum catalysts shown in Patent 2,970,150—Bailey, the chloroplatinic acid shown in Patent 2,823,218—Speier et al., the catalyst prepared by reacting chloroplatinic acid with alcohols, aldehydes or ethers of Patent 3,220,972—Lamoreaux, the platinum-olefin catalysts shown in Patent 3,159,601—Ashby, and the platinum-cyclopropane catalysts shown in Patent 3,159,662—Ashby.

The amount of catalyst employed in effecting the reaction can vary within wide limits with satisfactory reaction rates being obtained when the catalyst is present in an amount equal to from about one platinum atom per thousand to one platinum atom per 100,000 unsaturated groups in the imide of Formula 5.

The temperature at which the reaction can be conducted again varies within wide limits but generally satisfactory reactions are effected with temperatures of from about 50 to 100° C. With the platinum catalysts described above and the particular temperatures described above and the particular temperatures described above, complete reaction is effected in times which can vary from several minutes to several hours.

Once the reaction has been completed, the desired reaction product, which is the hydrolyzable silane containing the imide substituent of Formula 2, is isolated by any suitable means. For example, when the reaction has been effected in the presence of a solvent, the reaction mixture is fractionally distilled to remove solvent and further stripping is employed to remove any unreacted starting materials and the desired product is also separated by fractional distillation. The desired products are liquids which have varying boiling points, depending upon the substituents on the silicon atom.

A number of methods are available for converting the silanes of Formula 2 into siloxane compositions. The particular method of preparation can vary with the particular starting material and with the type of product desired. Thus, the method can vary from the simple procedure of mixing a silane of Formula 2 with water or a mixture of water and solvent to cause hydrolysis of the X group attached to silicon and subsequent condensation of the hydrolyzed product to a siloxane consisting entirely of a single type of siloxane unit within the scope of formula (3). On the other hand, it is often desirable to hydrolyze and condense two or more different hydrolyzable silanes within the scope of formula (2) to form a copolymer of two or more different siloxane units within the scope of formula (3).

Furthermore, it is sometimes desirable to cohydrolyze and cocondense one or more hydrolyzable silane units within the scope of formula (2) with one or more hydrolyzable silanes having the formula:

(7) $(R')_b SiX_{4-b}$ where R', X, and b are as previously defined. This results in a copolymer containing one or more siloxane units within the scope of Formula 3 and one or more siloxane units within the scope of formula (4). The ratio of siloxane units within the scope of formula (3) to siloxane units within the scope of formula (4) is, of course, a function of the particular ratio of hydrolyzable silanes employed as starting materials. In general, copolymers within the scope of the present invention can contain from about 0.1% to 99.9 mole percent siloxane units within the scope of formula (3) with the remaining siloxane units being within the scope of formula (4).

The method of cohydrolyzing and cocondensing hydrolyzable silanes of formula (2) with hydrolyzable silanes of formula (7) is well known in the art and need not be further defined.

In one embodiment of my invention, cyclic diorganosiloxanes containing 3 or 4 silicon atoms are prepared by reacting a hydrolyzable silane within the scope of formula (2) in which $a$ is equal to 1, with a disiloxanediol or trisiloxanediol having the formula:

(8) 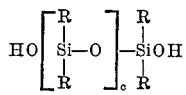

where R is as previously defined and $c$ is an integer equal to from 2 to 3, inclusive. Preferably, such cyclotrisiloxanes are prepared from silanes within the scope of Formula 2 in which X is chlorine and the reaction is effected by mixing equimolar amounts of the silane of formula (2) with the diol of formula (8) in the presence of at least one mole of pyridine per gram atom of silicon-bonded chlorine. The reaction system tends to cause condensation of the silane of formula (2) with the silanediol for formula (8) to produce the desired cyclotrisiloxane or cyclotetrasiloxane with pyridine hydrochloride being a by-product. The pyridine hydrochloride can be washed from the reaction mixture to produce the cyclic material having the formula:

(9) 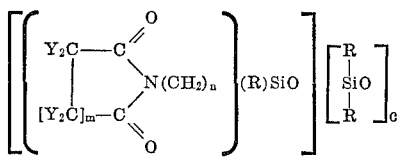

The general procedure employed in preparing the cyclopolysiloxanes of formula (9) is identical to the general procedure described in Patent 3,340,287—Sporck.

The cyclopolysiloxanes within the scope of formula (9), and particularly the cyclotrisiloxanes within the scope of formula (9), are useful in the preparation of silicone gums. These cyclotrisiloxanes can be rearranged and condensed by general techniques known in the art to produce high molecular weight polydiorganosiloxanes useful for formation into silicone rubber compounds. These cyclotrisiloxanes can be rearranged and condensed alone or can be rearranged and condensed after being mixed with other cyclotrisiloxanes, such as hexamethylcyclotrisiloxane or the cyclic trimer of methylvinylsiloxane with or without chain-stopping groups, such as hexamethyldisiloxane, also to produce high molecular weight siloxane gums which can be incorporated into silicone elastomer compositions.

The method for preparing silicone rubber compounds from such high molecular weight silicone gums is also old in the art and comprises the mixing of the gum, for example, in the ratio of 100 parts gum to 20 to 200 parts of finely divided silica and from 1 to 10 parts of an organoperoxide vulcanizing agent and heating the resulting compound at the temperature required for vulcanization.

The organic fillers and other fillers which can be added to the silicone elastomer formulations are those conventionally employed for such applications and include organic fillers such as copper phthalocyanine and various inorganic fillers including metal and non-metal oxides, such as oxides of aluminum, titanium, zirconium, magnesium and zinc, as well as siliceous materials, such as aluminum silicate, mica or glass, silica, such as diatomaceous earth, fume silica, sand, crushed quartz, silica aerogels, precipitated silica, fumed silica, and carbon, such as carbon black or graphite. The peroxides employed as cross-linking agents again include all of the conventional organoperoxide materials, including materials such as benzoyl peroxide, dibenzoyl peroxide, 2,4-dichlorobenzoyl peroxide, di-alpha-cumyl peroxide.

The following examples are illustrative of the practice of my invention and are not intended for purposes of limitation. All parts are by weight.

Example 1

To a reaction vessel was added 125.1 grams (1 mole) of N-vinylsuccinimide, 156 ml. (1.5 moles) of methyldichlorosilane and a sufficient amount of chloroplatinic acid hexahydrate to provide one gram of platinum per 10,000 vinyl groups. This mixture was refluxed for 12 hours and fractionally distilled to provide 90.9 grams (40% yield) of succinimidoethylmethyldichlorosilane which had a boiling point of 160° C. at 8 mm. and which was a solid at room temperature. This product was within the scope of Formula 2 when Y is hydrogen, $m$ is 1, $n$ is 2, $a$ is 1, R is methyl, and X is chlorine. An alternate name for this compound is beta-succinimidoethylmethyldichlorosilane.

Example 2

A solution was formed of 161.2 grams (0.67 mole) of beta-succinimidoethylmethyldichlorosilane is sufficient toluene to from 1200 ml. solution. A second solution was prepared from 111.6 grams (0.67 mole) of tetramethyldisiloxane-1,3-diol and 79 grams (1.0 mole) pyridine in sufficient toluene to provide 1200 ml. of solution. These two solutions were added slowly and at the same rate to a third solution of 121 grams (1.6 moles) of pyridine in 2400 ml. toluene. The addition was carried out at room temperature with stirring over a period of 1.5 hours, the reaction mixture was filtered to remove pyridine hydrochloride, the filtrate was washed twice with water, and the residue from the water wash was distilled to give a crude product boiling at 120–138° C. at 0.04 mm. This product was recrystallized three times from petroleum ether to produce 79.1 grams (35% yield) of pentamethyl-beta-succinimidoethylcyclotrisiloxane, which is within the scope of Formula 9 when Y is hydrogen, R is methyl, R' is methyl, $m$ is 1, $n$ is 2, and $c$ is 2. The identity of this product was confirmed by infrared analysis which showed a peak at 9.85 microns corresponding to the cyclotrisiloxane ring, a peak at 5.9 microns corresponding to the carbonyl group, a peak at 8.0 microns corresponding to the silicon methyl linkages, and a peak at 12.5 microns corresponding to the dimethylsiloxane units. Chemical analysis of this material showed the presence of 25.21% silicon and 4,20% nitrogen as compared with the theoretical values of 25.24% silicon and 4.20% nitrogen.

Example 3

Into a reaction vessel was added 200 parts by weight of the cyclotrisiloxane prepared in Example 2, 2 parts of a cyclotrisiloxane containing one methylvinylsiloxane unit and two diphenylsiloxane units and the mixture was heated to a temperature of 120° C. The mixture was then catalyzed with a sufficient amount of a dilute solution of n-butyl lithium in hexane to provide 100 parts per million n-butyl lithium. Within 45 seconds, this mixture had polymerized to a high viscosity gum which was stripped of hexane, cooled to room temperature, dissolved in ethyl acetate, decatalyzed with allyl bromide, filtered, and reprecipitated from hexane and dried. A sample of this material was dissolved in ethyl acetate and was found to have an intrinsic viscosity of 1.52 deciliters per gram. This product was a copolymer containing siloxane units in the ratio of approximately 150 siloxane units within the scope of Formula 3 when Y is hydrogen, $m$ is 1, $n$ is 2, $a$ is 1, and R is methyl, along with 300 dimethylsilioxane units, one methylvinylsiloxane unit, and two diphenylsiloxane units.

Example 4

A silicone rubber compound was prepared by mixing 100 parts by weight of the high viscosity gum prepared in Example 3 with 40 parts of finely divided fumed silica, 7 parts iron oxide, 5 parts diphenylsilanediol, and 0.5 part di-alpha-cumyl peroxide. This material was cured to a silicone rubber in a press at 1,000 p.s.i. and 170° C. for 15 minutes, followed by a post-cure at 200° C. for 24 hours to produce a rubber having a tensile strength of 950 p.s.i. and an elongation of 170%. Upon heat-aging at 250° C. for 3 days, this rubber had a tensile strength of 750 p.s.i. at 10% elongation and still retained a tensile strength of 310 p.s.i. and 30% elongation after heating at 200° C. for 4 weeks.

The solvent resistance of this rubber was evaluated by immersing it for 24 hours at room temperature in a mixture of 70% isooctane and 30% toluene and was found to swell only 19%, which is an acceptably low swell for a solvent resistant polymer.

The solvent resistance and hydrolytic stability of this rubber were further evaluated by maintaining a sample in contact with boiling water for 70 hours, at which time the tensile strength was 585 p.s.i. and the elongation was 165%. After maintaining another sample for 70 hours in a boiling mixture of the isooctane-toluene material described above, the tensile strength was still 595 p.s.i. with an elongation of 125%. All of these data show that these rubbers exhibit an unusual combination of solvent resistance, thermal stability and hydrolytic stability.

Example 5

The procedure of Example 4 was repeated except that finely divided Sterling 105 carbon black was employed instead of the silica filler of Example 4. This resulted in a cross-linked silicone rubber having a tensile strength of 600 p.s.i. and an elongation of 145%.

Example 6

When the procedure of Example 3 was repeated except that instead of 2 parts of the cyclotrisiloxane containing one methylvinylsiloxane unit and 2 diphenylsiloxane units was employed, the polymerization of the succinimidoalkyl material was effected with only one part of such cyclotrisiloxane, the resulting gum was a copolymer containing siloxane units in the approximate ratio of 300 siloxane units within the scope of Formula 3 where Y is hydrogen, R is methyl, $m$ is 1, $n$ is 2, and $a$ is 1; 600 dimethylsiloxane units, one methylvinylsiloxane unit and two diphenylsiloxane units. This gum has an intrinsic viscosity of 1.35 deciliters per gram, and when compounded with finely divided silica, iron oxide, diphenylsilanediol, and dicumyl peroxide in the same proportions employed in Example 4, the resulting silicone rubber has an initial tensile strength of 740 p.s.i. and an elongation of 360%. The swell of this material when immersed for 24 hours in the mixture of isooctane and toluene was only 24%. In a thermal stability evaluation, this rubber retained a strength of 405 p.s.i. and 30% elongation after 3 days at 250° C. The material was also very resistant to deterioration as indicated by the retention of 390 p.s.i. and 240% elongation after 70 hours in a boiling mixture of the isooctane-toluene mixture. After 48 hours at high pressure steam at 150° C., the tensile strength was still 40 p.s.i. and the elongation was 120%, which is remarkable, since most silicone elastomers containing polar groups will be completely destroyed under such conditions.

Example 7

A portion of the succinimidoalkyl-substituted cyclotrisiloxane prepared in Example 2 was mixed with a sufficient amount of a dilute solution of N-butyl lithium in hexane to provide 50 parts per million of butyl lithium. The reaction mixture was maintained at a temperature of 140° C. for one hour to produce a linear polysiloxane gum having an intrinsic viscosity of 1.17 deciliters per gram, which was a copolymer containing siloxane units in the ratio of one mole of the siloxane units of Formula 3, where Y is hydrogen, R is methyl, $m$ is 1, $n$ is 2, and $a$ is 1, with two moles of dimethylsiloxane units. A silicone rubber is prepared from this material by heating 100 parts of this gum with 40 parts of finely divided fumed silica and 3 parts of benzoyl peroxide. Upon press-curing this material at 1,000 p.s.i. and 150° C. with a post-cure of 200° C. for 2 hours, a strong solvent resistant hydrolytically stable silicone rubber is obtained.

Example 8

To a reaction vessel is added two liters of an equal volume mixture of water and tetrahydrofuran and slowly over a 2 hour period is added 50 parts of the silane of Example 1, with rapid stirring. This results in an aqueous layer and an oil layer. The oily layer is separated from the reaction mixture and stripped of water, tetrahydrofuran, and HCl. The product is then filtered through sodium bicarbonate to neutralize residual HCl and to produce a silicone fluid consisting essentially of siloxane fluids within the scope of Formula 3 in which Y is hydrogen, R is methyl, $m$ is 1, $n$ is 2, and $a$ is 1. When 100 parts of this material are mixed with 5 parts of finely divided silica, the resulting product is a grease useful in applications in which resistance to hydrocarbon solvents is required.

Example 9

When the general procedure of Example 1 is repeated and the unsaturated amides listed below are reacted with the silanes described below, the imidoalkylsilanes below are obtained. These materials can be hydrolyzed and condensed alone or with other materials to produce siloxanes useful as elastomers, gums, grease components and the like.

TABLE

| Imide | Silane | Product |
|---|---|---|
| $F_2C-C(=O)-N(-CH_2CH=CH_2)-C(=O)-CF_2$ (ring) | $HSi(OCH_3)_3$ | $F_2C-C(=O)-N(CH_2CH_2CH_2Si(OCH_3)_3)-C(=O)-CF_2$ (ring) |
| $H_3C-C(H_2C-CH_2)(=O)-N(-CH=CH_2)-C(=O)$ (ring) | $HSi(CH_3)_2OOCCH_3$ | $H_3C-C(H_2C-CH_2)(=O)-N(CH_2CH_2Si(CH_3)_2OOCH_3)-C(=O)$ (ring) |
| $H_2C-C(=O)-N(-CH=CH_2)-C(=O)-CH_2$ (ring) | $HSi(CH_3)_2NH(CH_2CH_3)$ | $H_2C-C(=O)-N(CH_2CH_2Si(CH_3)_2NH(CH_2CH_3))-C(=O)-CH_2$ (ring) |

| Imide | Silane | Product |
|---|---|---|
| 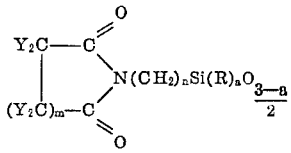 | HSi(CH₃)(O-C₆H₄-O)₂ | 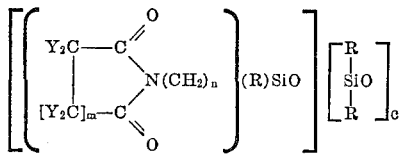 |

What I claim as new and desire to secure by Letters Patent of the United States is:

1. An imidoalkyl-substituted organosiloxane comprising units of the formula:

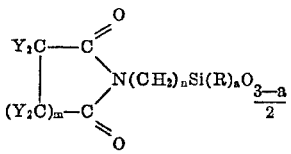

where Y is a member selected from the class consisting of hydrogen, halogen and methyl; R is a member selected from the class consisting of lower alkyl radicals, halogenated lower alkyl radicals, and halogenated phenyl radicals; $m$ is an integer equal to from 1 to 2, inclusive; $n$ is an integer equal to from 2 to 3, inclusive; and $a$ is a whole number equal to from 0 to 2, inclusive.

2. An organosiloxane of claim 1 in which R is methyl.
3. An organosiloxane of claim 1 in which Y is hydrogen.
4. An organosiloxane of claim 1 in which $m$ is 1.
5. An organosiloxane of claim 1 in which Y is hydrogen, R is methyl, $m$ is 1, $n$ is 2, and $a$ is 1.
6. Imidoalkyl-substituted organosiloxane copolymers comprising siloxane units of the formula:

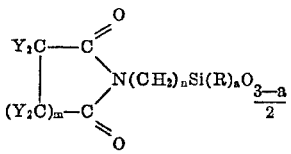

and siloxane units of the formula:

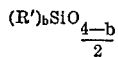

where Y is a member selected from the class consisting of hydrogen, halogen and methyl; R is a member selected from the class consisting of lower alkyl radicals, halogenated lower alkyl radicals, and halogenated phenyl radicals; R' is a member selected from the class consisting of monovalent hydrocarbon radicals, halogenated monovalent hydrocarbon radicals and cyanoalkyl radicals, at least 95 mole percent of the R' radicals being within the scope of the R radicals; $m$ is an integer equal to from 1 to 2, inclusive; $n$ is an integer equal to from 2 to 3, inclusive; $a$ is a whole number equal to from 0 to 2, inclusive; and $b$ is an integer equal to from 1 to 3, inclusive.

7. A copolymer of claim 6 in which Y is hydrogen, $m$ is 1, and $n$ is 2.
8. A copolymer of claim 6 in which R and R' are methyl.
9. A copolymer within the scope of claim 6 in which Y is hydrogen, R and R' are methyl, $m$ has a value of 1, and $n$ has a value of 2.
10. An imidoalkyl-substituted cyclopolysiloxane having the formula:

$$\left[\left[\begin{array}{c} Y_2C-C\overset{O}{\underset{O}{\diagdown}} \\ | \\ [Y_2C]_m-C \end{array} N(CH_2)_n \right] (R)SiO \right] \left[\begin{array}{c} R \\ | \\ SiO \\ | \\ R \end{array}\right]_c$$

where Y is a member selected from the class consisting of hydrogen, halogen, and methyl; R is a member selected from the class consisting of lower alkyl radicals, halogenated lower alkyl radicals, and halogenated phenyl radicals; $m$ is an integer equal to from 1 to 2, inclusive; $n$ is an integer equal to from 2 to 3, inclusive; and $c$ is an integer equal to from 2 to 3, inclusive.

11. A cyclopolysiloxane of claim 10 in which $c$ is equal to 2.
12. A cyclopolysiloxane of claim 11 in which Y is hydrogen, R is methyl, $m$ is 1, $n$ is 2, and $c$ is 2.

References Cited
UNITED STATES PATENTS

| | | | |
|---|---|---|---|
| 3,209,053 | 9/1965 | Gilkey et al. | 260—824 |
| 3,249,586 | 5/1966 | Haluska | 260—46.5 |
| 3,278,485 | 10/1966 | Morgan et al. | 260—46.5 |

DONALD E. CZAJA, *Primary Examiner.*

M. I. MARQUIS, *Assistant Examiner.*

U.S. Cl. X.R.

260—37, 78, 326.5, 448.2